United States Patent
Miyasaka

(10) Patent No.: US 10,817,234 B2
(45) Date of Patent: Oct. 27, 2020

(54) IMAGE PROCESSING DEVICE AND NON-TRANSITORY COMPUTER-READABLE COMPUTER MEDIUM STORING IMAGE PROCESSING PROGRAM

(71) Applicant: SEIKO EPSON CORPORATION, Tokyo (JP)

(72) Inventor: Yasutake Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/443,607

(22) Filed: Jun. 17, 2019

(65) Prior Publication Data

US 2019/0384551 A1 Dec. 19, 2019

(30) Foreign Application Priority Data

Jun. 19, 2018 (JP) .................................. 2018-116462

(51) Int. Cl.
*G06F 3/12* (2006.01)

(52) U.S. Cl.
CPC .......... *G06F 3/1256* (2013.01); *G06F 3/1208* (2013.01)

(58) Field of Classification Search
CPC .............................. G06F 3/1256; G06F 3/1208
See application file for complete search history.

(56) References Cited

U.S. PATENT DOCUMENTS

| 2010/0027958 | A1* | 2/2010 | Ubillos | G11B 27/034 386/248 |
| 2010/0253957 | A1 | 10/2010 | Sano et al. | |
| 2011/0058192 | A1* | 3/2011 | Hatanaka | H04N 1/54 358/1.9 |
| 2017/0264789 | A1* | 9/2017 | Miyahara | H04N 1/6097 |

FOREIGN PATENT DOCUMENTS

JP 2012-145949 8/2012

OTHER PUBLICATIONS

European Search Report for EP19181347.6 dated Oct. 21, 2019.

\* cited by examiner

*Primary Examiner* — Ibrahim Siddo
(74) *Attorney, Agent, or Firm* — Workman Nydegger

(57) ABSTRACT

Displaying a preview image is improved. An image processing device that displays on a display a preview image of printing a print job has a controller configured that acquires the printing order of multiple image layers included in the print job, generates a preview image overlaying the multiple image layers according to the acquired printing order, and displays the generated preview image on the display. The controller displays on the display an input field for receiving an instruction specifying the printing order of the multiple image layers, and acquires the printing order by receiving the instruction through the input field.

12 Claims, 11 Drawing Sheets

IMAGE PROCESSING DEVICE AND NON-TRANSITORY COMPUTER-READABLE COMPUTER MEDIUM STORING IMAGE PROCESSING PROGRAM

BACKGROUND

1. Technical Field

The present invention relates to an image processing device and a non-transitory computer-readable computer medium storing an image processing program.

This application is based upon Japanese Patent Application 2018-116462 filed on Jun. 19, 2018, the entire contents of which are incorporated by reference herein.

2. Related Art

Display devices that, by using a specific color to display an image that is printed using a transparent recording material, display a second image that is printed using a transparent recording material at the same location on a print medium as a first image that is printed using a recording material other than a transparent recording material, are known from the literature. See, for example, JP-A-2012-145949.

However, when printing by overlaying multiple image layers, improvement is needed to more appropriately display a preview of the printout before printing starts.

SUMMARY

An image processing device displays on a display a preview image of printing a print job containing multiple image layers, and includes: a controller configured to acquire the printing order of multiple image layers included in a print job, generate a preview image overlaying the multiple image layers according to the acquired printing order, and display the generated preview image on the display.

An image processing device that displays on a display a preview image of printing, and includes a controller that displays on a display a selection field for selecting a print job and one of multiple image layers contained in the print job, generates a preview image overlaying the multiple image layers when a print job is selected in the selection field, displays the generated preview image on the display, and when one of multiple image layers is selected in the selection field, displays the selected image layer as a preview image on the display.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures. Note that the accompanying figures are for descriptive purposes only. The images are simply examples and may not conform to each other.

1. System Outline

Figure 1:
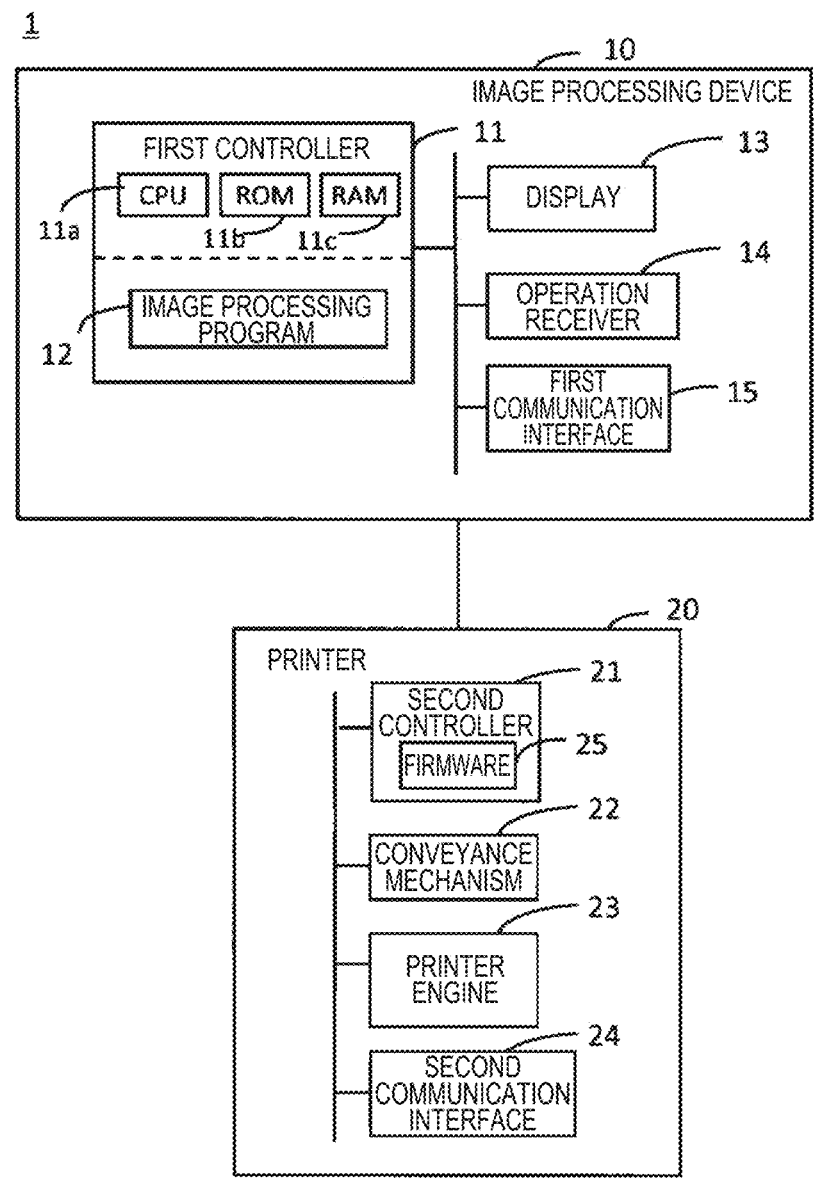
FIG. 1 is a simplified block diagram of the system configuration.

FIG. 1 is a block diagram of the configuration of a system 1 according to this embodiment. The system 1 includes an image processing device 10, and a printer 20. The system 1 may also be referred to as an image processing system or a printing system.

The image processing device 10 may be configured by a personal computer, smartphone, tablet computer, cell phone, other image processing device having equivalent processing capabilities. The image processing device 10 includes a first controller 11, display 13, operation receiver 14, and a first communication interface 15. The first controller 11 may be configured with multiple IC chips such as a CPU 11$a$ or other processor, RAM 11$c$, ROM 11$b$ or other type of nonvolatile memory.

The first controller 11 controls the image processing device 10 by the processor, the CPU 11$a$ in this example, executing processes according to a program stored in ROM 11$b$ or other memory, and using RAM 11$c$ or other memory as a work area. The first controller 11 in this example executes processes according to an image processing program 12. More specifically, an image processing program 12 is installed on the first controller 11. The image processing program 12 functions as RIP software that generates print data rendered for each color of recording material the printer 20 uses to print. RIP is an abbreviation for Raster Image Processor.

Note that the processor is not limited to configurations having a single CPU, and be configured to execute processes using multiple CPUs, an ASIC, or other hardware, or configured to execute processes through the cooperation of a CPU and other hardware circuits.

The display 13 is a means for visually presenting information, and may be configured with a liquid crystal display device or an OELD device, for example. The display 13 may also be a configuration having a display and a driver circuit for driving the display.

The operation receiver 14 is a means for receiving user operations, and may be configured with physical buttons, a touch panel, a mouse, keyboard, or other device. A touch panel may obviously configured as a function of the display 13. The display 13 and operation receiver 14 combined may also be referred to as an operating panel of the image processing device 10.

The display 13 and operation receiver 14 may be part of the configuration of the image processing device 10, or peripheral devices externally connected to the image processing device 10.

The first communication interface 15 is a general term for one or multiple interfaces enabling communication with external devices by wire or wirelessly according to a specific communication protocol, including known communication protocols.

The printer 20 includes a second controller 21, conveyance mechanism 22, printer engine 23, and a second communication interface 24. The conveyance mechanism 22 conveys print media in a specific conveyance direction. The print medium may also be referred to as simply media.

The printer engine 23 prints print data on the media conveyed by the conveyance mechanism 22 using an inkjet or electrophotographic printing method. The printer engine 23 prints by affixing different colors of recording material to the media based on the print data. The recording material the printer 20 uses in this embodiment is called ink, but references to ink may be replaced by references to toner.

The second communication interface 24 is a general term for one or multiple interfaces enabling communication with external devices by wire or wirelessly according to a specific communication protocol, including known communication protocols.

The second controller 21 includes a processor on the printer 20 side, and controls parts of the printer 20. The second controller 21 also includes firmware 25. The second controller 21 executes the firmware 25 to control the printer engine 23 to print based on print data sent from the image processing device 10.

The image processing device 10 and printer 20 are communicatively connected by wire or wirelessly through the first communication interface 15 and second communication interface 24. The image processing device 10 and printer 20 may obviously also connect through a network not shown. The printer 20 may also be configured as a multifunction device having multiple functions such as a scanner function, a facsimile function, or both, in addition to a printing function.

The image processing device 10 is also not limited to being configured as an independent, stand-alone image processing device, and may be configured by multiple image processing devices communicatively connected together through a network. The image processing device 10 and printer 20 may also be configured as a single integrated system. In other words, the processes executed by the image processing device 10 as described below may be executed by the printer.

2. Brief Description of Multi-Layer Printing

In this embodiment of the invention the image processing device 10 controls the printer 20 to execute multi-layer printing based on a print job.

Figure 2A:
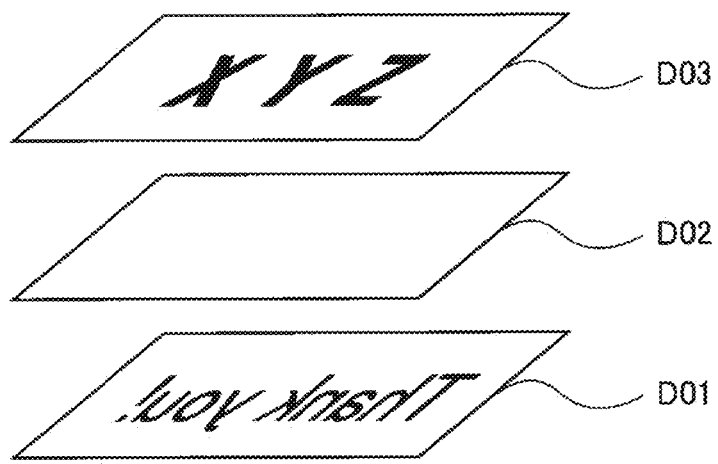
FIG. 2A shows an example of a print job having three printing layers.
Figure 2B:
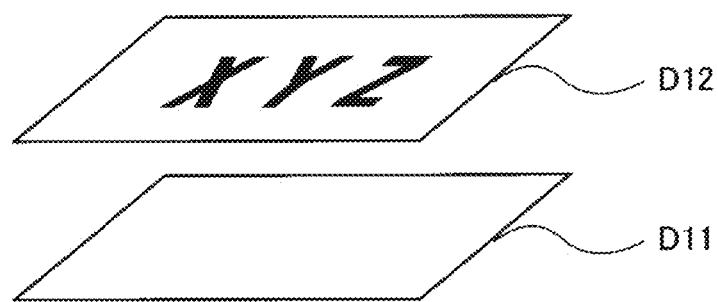
FIG. 2B shows an example of a print job having two printing layers.

FIG. 2 schematically illustrates multi-layer printing. FIG. 2A shows an example of when the print job the image processing device 10 executes contains three image layers, and FIG. 2B shows an example of when the print job the image processing device 10 executes contains two image layers.

The image data D01, D02, D03 shown in FIG. 2A are bitmap data, and are the image layers contained in one print job. An image layer may also be referred to as an impression. In this example, image data D01 and image data D03 are color image data for objects such as illustrations, photographs, text, or logos, and contain RGB (red, green, and blue) gradation values for each pixel in the image data.

Image data D02 is image data of a specific color (also referred to below as specific-color image data), and in this example represents an image layer printed with W (white) ink. In this embodiment, white is referred to as a specific color. The specific-color image data includes gradation values for the specific color for each pixel in the image data. The gradation values range from 0 to 255 representing 256 gradations in this example.

Image data D11 and D12 shown in FIG. 2B are also bitmap data, and are the image layers contained in one print job. In this example, image data D11 is image data of a specific color representing an image layer printed with white ink. Image data D12 is color image data. In this example the specific-color image data for an image layer printed with white ink is also referred to as a white impression.

To print based on a print job containing image data D01, D02, D03 such as shown in FIG. 2A, the image processing device 10, or more specifically the first controller 11 that runs the image processing program 12, generates print data from each of the image data D01, D02, D03. The first controller 11 then sends the print data generated for the three layers to the printer 20, causing the printer 20 to print based on the print data.

Likewise, to print based on a print job containing image data D11 and D12 such as shown in FIG. 2B, the first controller 11 that runs the image processing program 12 generates print data from each of the image data D11 and D12. The first controller 11 then sends the print data generated for the two layers to the printer 20, causing the printer 20 to print based on the print data.

More specifically, using a specific lookup table or function, the first controller 11 applies, to each pixel in the image data, a color conversion process that converts RGB gradation values to CMYK gradation values corresponding to the colors of ink the printer 20 uses to print, which in this example are CMYK (cyan, magenta, yellow, black) inks.

Using a specific lookup table or function, the first controller 11 also applies, to each pixel in the specific-color image data, a conversion process that converts the gradation values of the specific color, white in this example, to gradation values expressing the amount of ink of the specific color to print with consideration for the color reproducibility characteristics of the printer 20 and the characteristics of the media.

The first controller 11 then acquires print data for each image layer by applying a gradation conversion process such as halftone processing, for example, to the color image data and the specific-color image data acquired by the above conversion processes.

For simplicity and ease of understanding below, when the printer 20 is said to print based on print data the first controller 11 generates, for example, from image data D01 shown in FIG. 2A and FIG. 2B is referred to below as simply the printer 20 printing the image data D01.

In the example shown in FIG. 2A, the color image data D01 for the first layer is printed on transparent film used as the print medium in this example, the specific-color image data D02 for the second layer is then printed, and finally the color image data D03 for the third layer is printed. As a result, the specific-color image data D02 printed as the second layer forms a base layer for the color image data D01 of the first layer and the color image data D03 of the third layer, the image formed by the color image data D01 on the first layer is therefore visible from one side of the transparent film, and the image formed by the color image data D03 on the third layer is visible from the other side of the transparent film.

In the example shown in FIG. 2B, the specific-color image data D11 for the first layer is printed first using paper as the medium, and the color image data D12 for the second layer is then printed. As a result, the specific-color image data D11 printed on the first layer is the base layer of the color image data D12 printed on the second layer, and the image expressed by the color image data D12 on the second layer is visible.

Note that the specific color is not limited to white. Clear ink and metallic ink are other examples of specific colors of ink. More specifically, the print job may include specific-color image data in which an image layer printed with clear ink is expressed by gradation values for each pixel, or specific-color image data in which an image layer printed with metallic ink is expressed by pixel gradation values.

The number of image layers in a print job may also be greater than three. In one embodiment of the invention, the image processing device 10 processes print jobs containing specific-color image data and color image data as image layers. Note also that specific-color image data expressing an image layer printed with clear ink is referred to as a clear impression, and specific-color image data expressing an image layer printed with metallic ink is referred to as a metallic impression.

3. Preview Image Display Control Process

Figure 3:
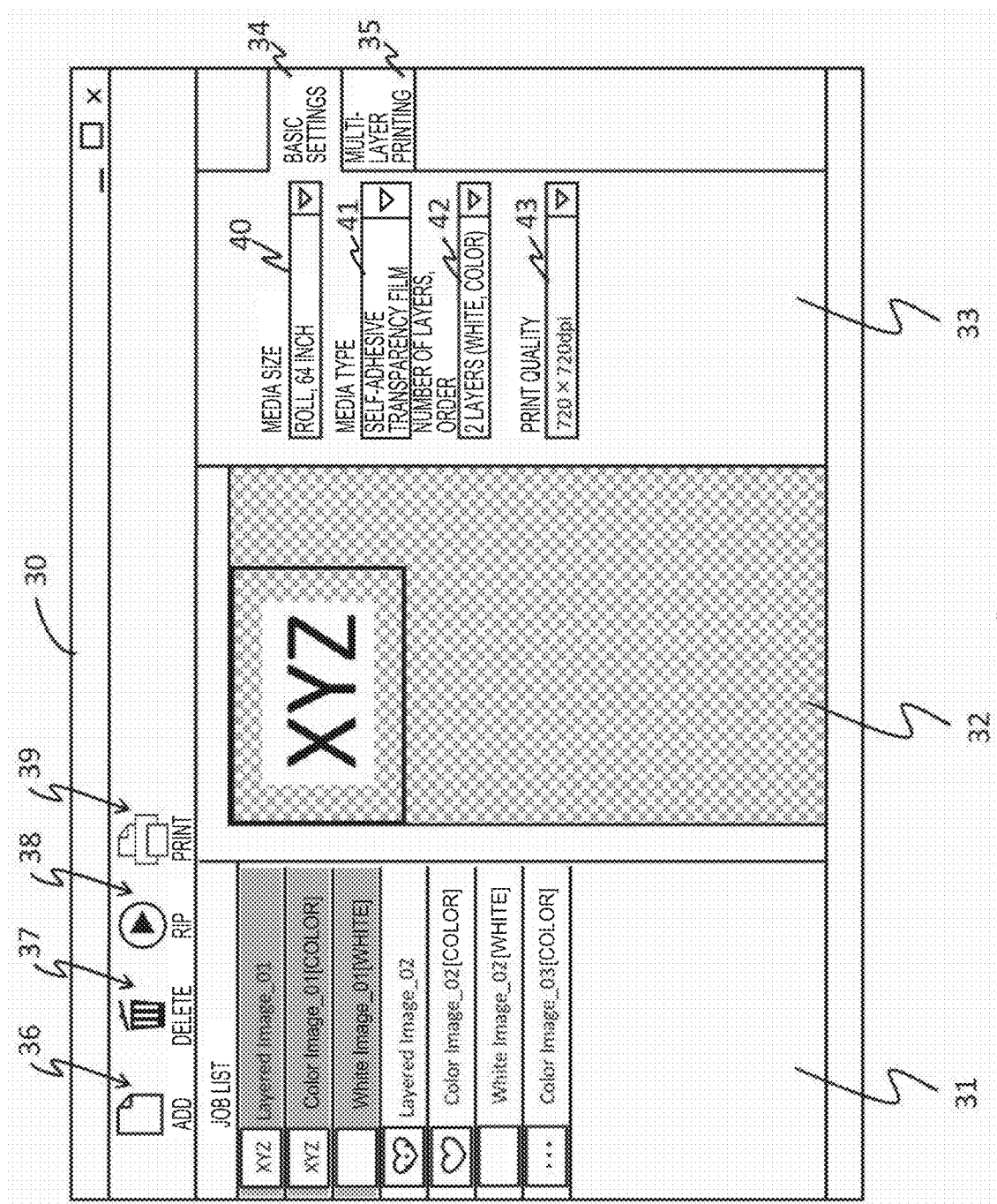
FIG. 3 shows an example of a user interface.

FIG. 3 shows an example of a user interface according to this embodiment. When the first controller 11 starts the image processing program 12 in response to user operation of the operation receiver 14, the first controller 11 displays the user interface window 30 on the display 13 according to the image processing program 12.

The user interface window 30 includes a job list pane 31, a preview pane 32, and a print settings pane 33. Multiple tabs 34, 35 are displayed in the print settings pane 33, and the user interface for the print settings corresponding to the tab selected by the user is displayed in the print settings pane 33. In the example in FIG. 3, the basic settings tab 34 is selected, and multiple input fields 40, 41, 42, 43 corresponding to the basic settings tab 34 are displayed in the print settings pane 33.

Input field 40 is for receiving the setting for the size of media used for printing. Input field 41 is for receiving the setting for the type of media. Input field 42 is for receiving the setting for the number of layers, also referred to as the layer count, contained in the print job, and the setting for the printing sequence of the image layers. The printing sequence of the image layers is the order in which the image layers are printed. Input field 43 is for receiving the setting for the print quality setting. In this example, each of the input fields 40, 41, 42, 43 is displayed as a pull-down menu, and the user can select the desired media size, media type, number of layers and printing sequence, and print quality settings from among multiple options.

The user interface window 30 also has an Add button 36, Delete button 37, RIP button 38, and a Print button 39. The Add button 36 is a button for adding a print job to the job list pane 31. The first controller 11 reads the desired image file F selected by the user operating the Add button 36 from the address where the image file F is stored. The user can select the desired image file F from any device accessible by the first controller 11, including internal or external memory of the image processing device 10, a hard disk drive, or a server on a network, for example.

Figure 4:
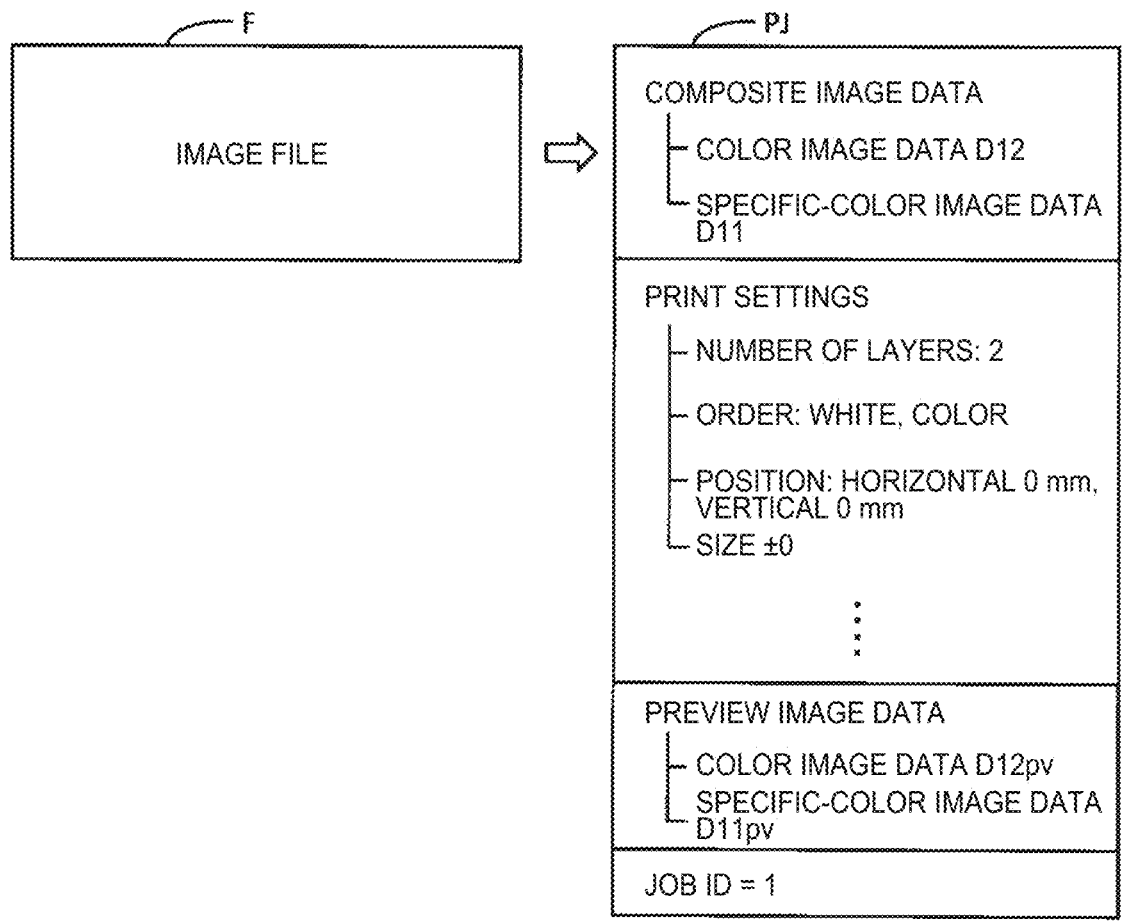
FIG. 4 shows a simple example of a print job configuration.

FIG. 4 shows a simple example of the configuration of a print job.

The first controller 11 creates a print job PJ in a specific format from the image file F selected by the user operating the Add button 36 as described above.

The image file F is a file expressing an image previously generated using a drawing program or image editor, for example. The first controller 11 analyzes the image file F, and stores the image layers configuring the image expressed by the image file F as a print job PJ. The image expressed by the image file F may also be referred to as composite image data. In the example in FIG. 4, the composite image data of the image file F is assumed to comprise the specific-color image data D11 and color image data D12 shown in FIG. 2B. In this case, the first controller 11 stores the image data D11 and D12 of the composite image data of the image file F.

Note that depending on the format of the image file F, the composite image data may be image data produced by merging multiple image layers. In this case, the first controller 11 analyzes and separates the composite image data into multiple image layers of color image data and specific-color image data, and stores the separated image layers.

The first controller 11 then generates preview image data for each image layer stored as part of the print job PJ, and stores the generated preview image data as part of the print job PJ. In the example in FIG. 4, the first controller 11 generates specific-color image data D11$pv$ by reducing the specific-color image data D11 by a specific reduction ratio, and stores the result as preview image data for one image layer. The first controller 11 similarly generates color image data D12$pv$ by reducing the color image data D12 by a specific reduction ratio, and stores the result as preview image data for one image layer The print job PJ also includes print settings information. However, the print settings information in the print job PJ is information the first controller 11 acquires in response to operation of the print settings pane 33. When the first controller 11 generates the print job PJ based on the image file F selected as described above in response to operation of the Add button 36, the print settings in the print job PJ are either blank or set to specific default settings.

The first controller 11 also assigns a job ID to the print job PJ to differentiate it from other print jobs.

Figure 5:
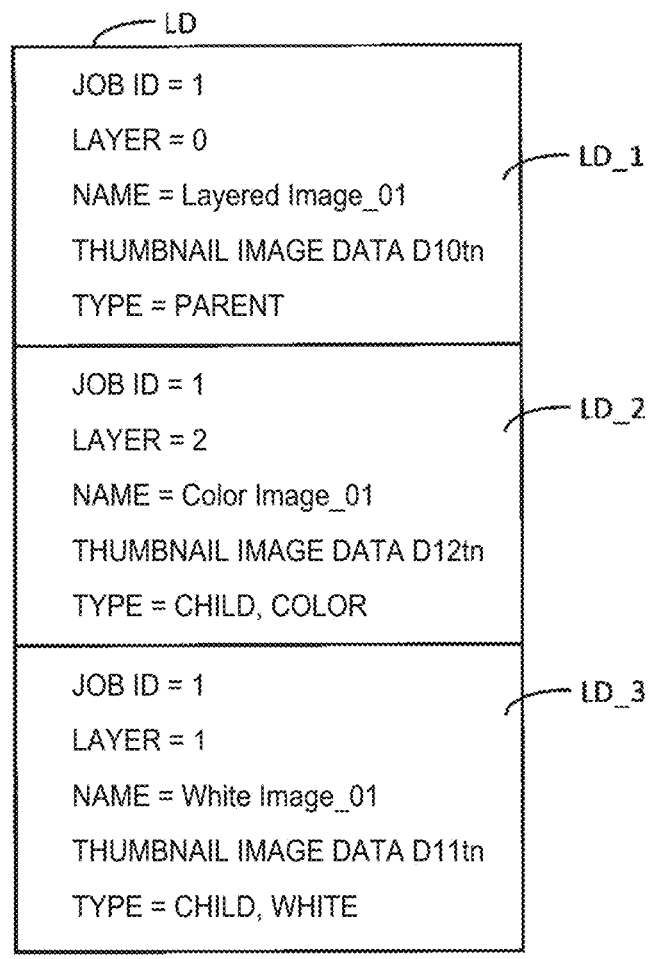
FIG. 5 shows a simple example of list data for a print job.

FIG. 5 shows a simple example of the configuration of list data LD for a print job PJ. One list data LD object is data for displaying the existence of one print job PJ in the job list pane 31.

The first controller 11 generates and stores the list data LD relationally to the print job PJ. The list data LD may be understood as part of the print job PJ. The list data LD is a set of data for identifying the corresponding print job PJ, and data identifying the image layers contained in the print job PJ. In the list data LD, the data identifying the print job PJ is referred to as parent data, and the data identifying the image layers in the print job PJ is referred to as child data.

In the example in FIG. 5, reference numeral LD_1 identifies the parent data, and reference numerals LD_2 and LD_3 identify child data. In this example, child data LD_2 is data for identifying color image data D12 in the job list pane 31, and child data LD_3 is data for identifying specific-color image data D11 in the job list pane 31. The parent data LD_1 and child data LD_2, LD_3 in the list data LD all contain the job ID of the corresponding print job PJ, that is, the same job ID.

In addition to the job ID, data LD_1, LD_2, LD_3 contain such information as the layer order, name, thumbnail image data, and layer type.

The layer order indicates the relative sequence of the data LD_1, LD_2, LD_3 having the same job ID. However, the first controller 11 sets the layer order of the parent data LD_1 to 0. Layer order 0 means that data object is displayed at the top in the group of data objects having the same job ID in the job list pane 31.

The first controller 11 may automatically assign the layer order of the child data LD_2 and LD_3. Alternatively, when information directly or indirectly indicating the layer order of the image layers is specified in the image file F from which the print job PJ is generated, the first controller 11 may set the layer order of the child data LD_2 and LD_3 based on that information. In any case, the layer order is information indicating the display sequence of items listed in the job list pane 31, and the method of setting the order should not be interpreted as being limited. The actual layer order of the image layers in the print job, that is, the printing sequence, is set through input field 42 in the print settings pane 33.

The first controller 11 also sets the names of data LD_1, LD_2, LD_3 by analyzing the image file F based on which the print job PJ is generated. The first controller 11 may use the file name of the image file F as the name of the parent data LD_1. For the names of the child data LD_2 and LD_3, the first controller 11 may also use the specified name of each image layer as the name of the child data LD_2 and LD_3 if the name of each image layer is specified in the image file F. If the name of each image layer is not specified in the image file F, the first controller 11 may reference the file name of the image file F to automatically assign a different name for each image layer to the child data LD_2 and LD_3. The first controller 11 may also not assign a name to the child data LD_2 and LD_3, that is, leave the name field blank.

The thumbnail image data is image data that is reduced even more than the preview image data. More specifically, the first controller 11 reduces the color image data D12 even more than when generating the color image data D12$pv$, generating thumbnail image data D12$tn$ corresponding to the color image data D12, and stores the thumbnail image data D12$tn$ in the child data LD_2.

The image processing program 12 also stores thumbnail image data D10$tn$, which is generated by overlaying thumbnail image data D12$tn$ corresponding to the color image data D12 with thumbnail image data D11$tn$ corresponding to specific-color image data D11 in the parent data LD_1.

The first controller 11 also sets information identifying the parent data LD_1 as parent data as the data type of parent data LD_1, and information identifying the child data LD_2 and LD_3 as child data as the data type of child data LD_2 and LD_3. For the child data LD_2 and LD_3, the first controller 11 also adds information such as color or white as data type information indicating whether the corresponding image layer is color image data or specific-color image data.

Based on the generated list data LD, the first controller 11 displays print jobs in the job list pane 31 as shown in FIG. 3. In the example in FIG. 3, Layered Image_01, Color Image_01 (color), and White Image_01 (white) shown in the job list pane 31 identify one print job and the image layers contained in the one print job. More specifically, the first controller 11 consecutively displays the name Layered Image_01 of the print job PJ based on the parent data LD_1 in the list data LD, Color Image_01 (color) as the name and type of the image layer based on child data LD_2, and White Image_01 (white) as the name and type of the image layer based on child data LD_3 in the job list pane 31.

As will be understood from FIG. 3, a small rectangular thumbnail image is also displayed in the job list pane 31 together with the names of the print job and image layers. The thumbnail images in the job list pane 31 are displayed based on the thumbnail image data D10$tn$, D11$tn$, and D12$tn$ in the list data LD. Note that in the example in FIG. 3, the information of the child data LD_2 and LD_3 sharing the same job ID is displayed in descending order of the layer order number set in the list data LD.

Prompted by the user operating the Add button 36 to select a desired image file F, the first controller 11 generates print job PJ and list data LD based on the selected image file F, and based on the generated list data LD displays the presence of the print job PJ in the job list pane 31 of the user interface window 30 as described above. As a result, the user knows that a print job was added to the job list pane 31.

For convenience below, the print job indicated by Layered Image_01 in the job list pane 31 is referred to as the first print job.

By displaying Layered Image_02, Color Image_02 (color), White Image_02 (white) and Color Image_03 (color) in the job list pane 31 in the example in FIG. 3, a second print job that is different from the first print job, and the image layers in the second print job, are also displayed. As described with reference to FIG. 4 and FIG. 5, this second print job is added to the job list pane 31 through the process of generating a print job and list data based on the desired image file selected by the user.

Figure 6:
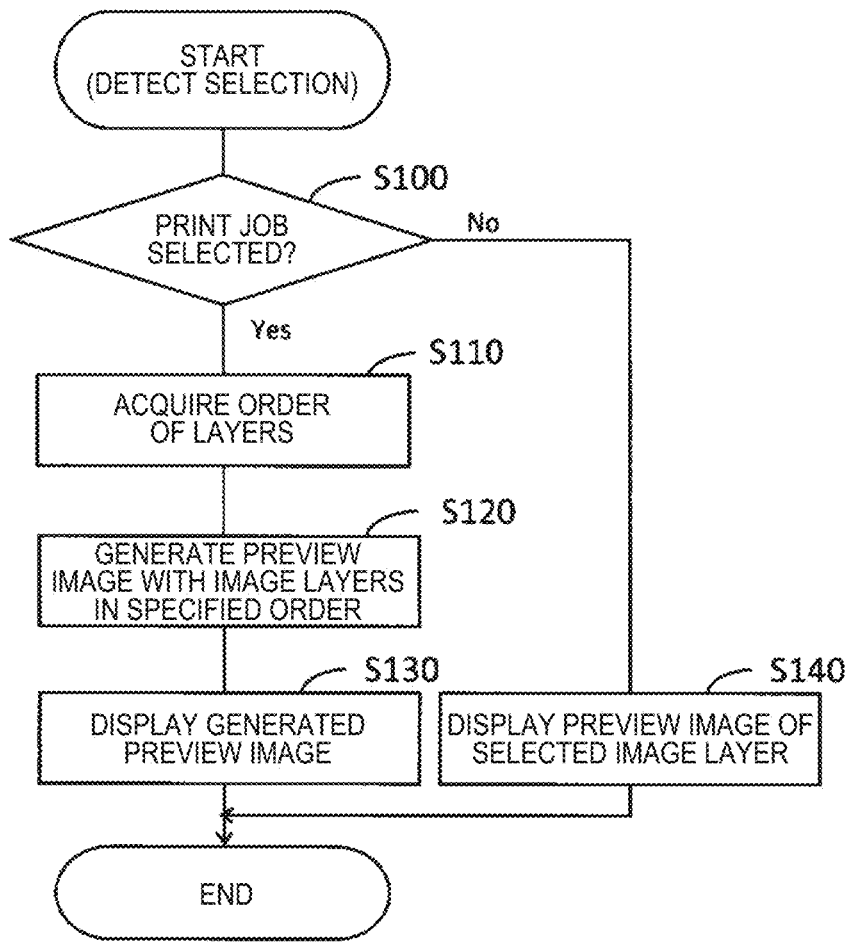
FIG. 6 is a flow chart of a preview image display control process.

FIG. 6 is a flow chart of the preview image display control process the first controller 11 executes according to the image processing program 12. By operating the operation receiver 14, the user selects the desired print job and image layers from the job list pane 31. The first controller 11 starts the process in the flow chart in FIG. 6 when the user interface window 30 is displayed on the display 13 and selection of a print job or image layer from the job list pane 31 is detected.

In this example, the job list pane 31 is an example of an input field for selecting a print job and one of multiple image layers contained in the print job.

In step S100, the first controller 11 determines whether or not a print job was selected. A print job being selected means that a field corresponding to parent data was selected in the job list pane 31. In the example in FIG. 3, the first controller 11 determines a print job was selected if the field indicating the Layered Image_01 in the first print job, or the field indicating the Layered Image_02 in the second print job is selected with the cursor or other pointing device operated by the user, and then goes to step S110.

However, if an image layer contained in a print job is selected, the first controller 11 determines a print job was not selected, and goes to step S140. In the example in FIG. 3, the first controller 11 goes to step S140 if the field indicating Color Image_01 (color)" or White Image_01 (white) in the first print job, or Color Image_02 (color), White Image_02 (white), or Color Image_03 (color) in the second print job, is selected.

Selection of the first print job is indicated in FIG. 3 by displaying part of the job list pane 31 gray. More specifically, when the first controller 11 detects that the display field Layered Image_01 of the first print job was selected, it determines the first print job was selected and changes a display state, such as the color, of the Layered Image_01, Color Image_01 (color) and White Image_01 (white) fields in the job list pane 31 to a different state (color, in this example) than the other parts of the job list pane 31.

In step S110, the first controller 11 acquires the order of the image layers in the selected print job. In this case, the first controller 11 acquires the layer order currently set in the input field 42 of the print settings pane 33. Because "2 layers (white→color)" is selected in the input field 42 in the example in FIG. 3, the first controller 11 acquires the layer order white, then color.

In step S120 the first controller 11 generates a preview image with the image layers stacked in the layer order acquired in step S110. More specifically, in this example the first print job is currently selected, and the layer order of the image layers is white, then color. As a result, the first controller 11, using the preview image data for the first print job, that is, the specific-color image data D11$pv$ and color image data D12$pv$ shown in FIG. 4, generates a preview image by setting the specific-color image data D11$pv$ as the first layer, and then superimposing the color image data D12$pv$ as the second layer over the first layer.

The user can also change the number of layers and the layer order settings by using the input field 42 in the print settings pane 33. As a result, if the first print job is selected and the user then selects 2 layers (color→white) in the input field 42, the first controller 11 acquires the layer order color, then white, in step S110, and in step S120 generates a preview image by setting the color image data D12$pv$ as the first layer, and then superimposing the specific-color image data D11$pv$ as the second layer over the first layer.

In step S130 the first controller 11 renders and displays the preview image generated in step S120 in the preview pane 32 of the user interface window 30.

Figure 7A:
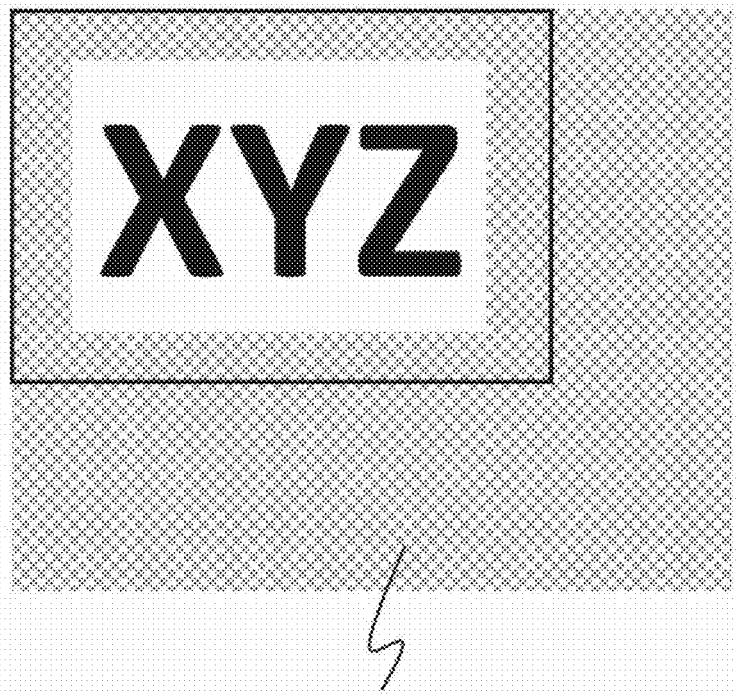
FIG. 7A shows an example of a preview image when the layering order is white, then color.

FIG. 7A shows an example of a preview image displayed in the preview pane 32 in step S130 when the layer order acquired in step S110 is white→color.

Figure 7B:
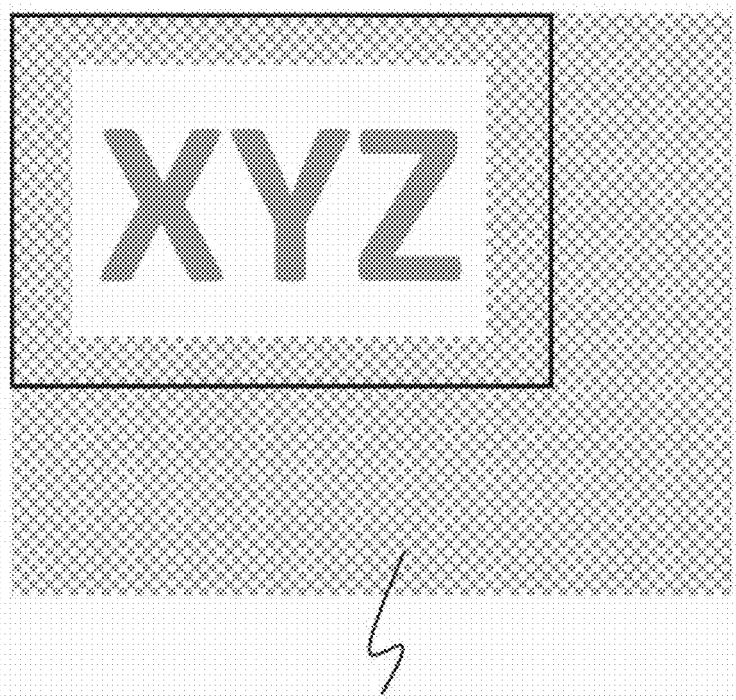
FIG. 7B shows an example of a preview image when the layering order is color, then white.

FIG. 7B shows an example of a preview image displayed in the preview pane 32 in step S130 when the layer order acquired in step S110 is color→white.

Note that FIG. 7A is an enlarged view of part of the preview pane 32 in FIG. 3.

In the examples in FIG. 3, FIG. 7A, and FIG. 7B, the background of the preview pane 32 is a checkered pattern of white and gray. This checkered pattern is an example of a specific pattern used as the background in the preview pane 32. The background of the preview pane 32 is obviously not limited to a checkered pattern, and other patterns or textures, such as dotted patterns and hatching, may be used.

A white impression such as with specific-color image data D11 has the white density of each pixel expressed as a gradation value, and the white gradation value of some pixels is set to no gradation (pixels where W=0). When a preview of the specific-color image data D11 is displayed, that is, when specific-color image data D11$pv$ is displayed in the preview pane 32, if the background of the preview pane 32 is a solid white, areas with a white gradation value in the specific-color image data D11$pv$ (where W≠0), and areas with no white gradation value, cannot be differentiated.

By displaying the background of the preview pane 32 with a specific pattern, the first controller 11 in this embodiment enables differentiating areas having a white gradation value and areas with no white gradation value in the image layer printed with white ink.

The frame indicated by a black line in the top left area of the preview pane 32 is the outside edge of the preview image. A white rectangle is shown in approximately the center of the preview image in the examples in FIG. 7A and FIG. 7B, and the area outside the white rectangle and inside the preview image has the same checkered pattern as the background of the preview pane 32. More specifically, the white rectangle in the preview image is the area with a white gradation value. By displaying the preview image in this way, the user can identify, before printing starts, the area where white ink is recorded and the area where white ink is not recorded based on the specific-color image data D11.

Note that when a preview image is generated in step S120 and is then displayed in the preview pane 32 in step S130, the first controller 11 applies a transparency process to at least pixels other than objects in each image layer in the preview image, and then displays the preview image. In the specific-color image data D11$pv$, the objects are in the center of the rectangle with pixels having a white gradation value. In the color image data D12$pv$, the objects are the letters XYZ. FIG. 7A and FIG. 7B show the preview image with the pixels other than for the objects in the specific-color image data D11$pv$ and color image data D12$pv$ transparent.

By applying a transparency process to at least pixels outside the objects in each image layer in the preview image, the first controller 11 can enable the user to see in the preview image the areas that are not covered by objects in any image layer, including the topmost image layer and image layers other than the topmost image layer.

Printing a base layer of white ink on the media, and then printing a color image over the base layer of white ink has the effect of making the colors in the color image more brilliant. Printing a color image on media and then printing white ink over the printed color image has the effect of lightening or blurring the color image. In other words, the printing effect can be changed by changing the order in which the image layers are printed.

As will be understood from comparing FIG. 7A and FIG. 7B, the image density, and particularly the density of the objects XYZ in the color image data D12$pv$, is different in the preview image where the layer order is white—color, and the preview image where the layer order is color—white. More specifically, the objects XYZ expressed by the color image data D12$pv$ in the preview image in FIG. 7B are drawn with a lighter color than the objects XYZ expressed by the color image data D12$pv$ in the preview image in FIG. 7A. By generating and displaying a preview image according to the layer order of the image layers as described in this embodiment, the first controller 11 can show the user the results of printing the image layers in different sequences before starting printing.

When generating a preview image in the layer order color—white in step S120, the first controller 11 may apply a color correction process that lightens the color of the XYZ objects in the color image data D12$pv$ that is overlaid to the objects in the specific-color image data D11$pv$, that is, the areas having a white gradation value, according to the white gradation values. The first controller 11 then draws the XYZ objects to which the color correction process was applied in the preview image. This process clearly shows the user the difference between the preview image generated in the layer order color—white and the preview image generated in the layer order white—color.

The number of layers and the layer order that can be selected in the input field 42 of the print settings pane 33 is not limited to the foregoing. If the print job contains three image layers as shown in the example in FIG. 2A, the first controller 11 may enable the user to select from the input field 42 options such as 3 layers (color—white—color)
3 layers (white—color—color)
3 layers (color—color—white).

If the print job contains three image layers, one layer is color image data, and the other two layers are specific-color image data, the first controller 11 may enable the user to select from the input field 42 options such as 3 layers (white—color—white)
    3 layers (white—white—color)
    3 layers (color—white—white).

If the print job contains two image layers including a clear layer or a metallic layer, the first controller 11 may enable the user to select from the input field 42 options such as 2 layers (color—metallic)
    2 layers (metallic—color)
    2 layers (color—clear)
    2 layers (clear—color).

It will also be obvious that if there are three or more layers, the order of the image layers may also include metallic layer and clear layer options.

The first controller 11 generates the preview image by overlaying the image layers contained in the print job according to the layer order selected from among the available options. In other words, if the acquired layer order is a first order, or the acquired layer order is a second order that is different from the first order, the first controller 11 generates preview images with different densities in at least part of the image.

In step S140, the first controller 11 renders and displays a preview image of the selected image layers in the preview pane 32. In step S140, the first controller 11 may display the preview image after applying a transparency process to at least pixels outside the image objects in the image layers to be displayed as a preview image.

Figure 8:
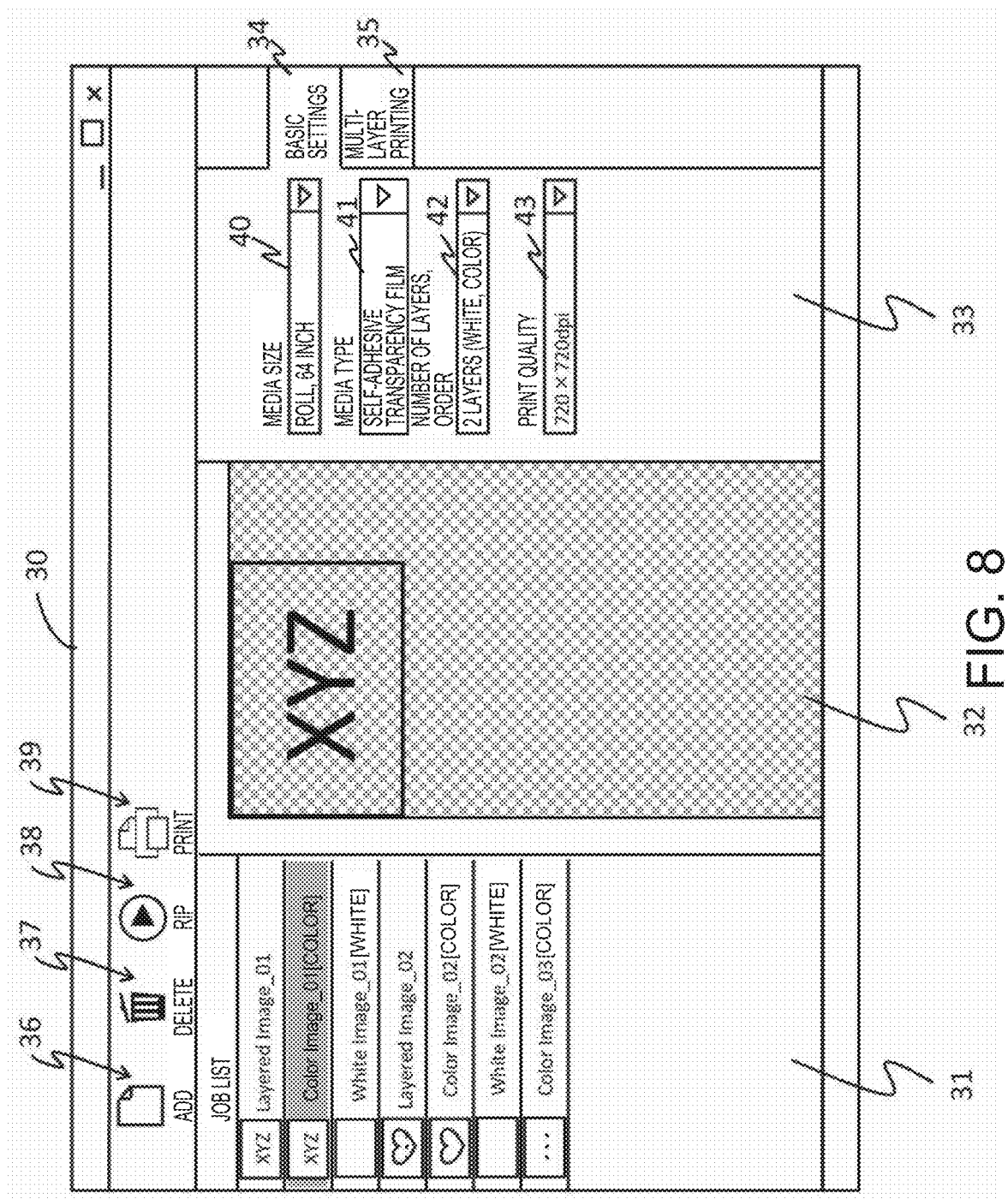
FIG. 8 shows an example of a user interface.

FIG. 8 shows another example of the user interface window 30. Unlike in FIG. 3, a single image layer is selected in the job list pane 31 in FIG. 8. More specifically, the field Color Image_01 (color) indicating color image data D12 contained in the first print job is selected. In this case, the first controller 11 goes from the decision of step S100 to step S140, and displays the color image data D12$pv$ shown in FIG. 4, which is preview image data for the color image data D12, in the preview pane 32. FIG. 8 shows when the color image data D12$pv$ is displayed in the preview pane 32.

As described above, the print job may include a metallic impression or a clear impression. To display a preview image for a print job including a metallic impression in step S130, or to display a preview image of a metallic impression in step S140, the first controller 11 may display in the preview pane 32 a specific color of silver or gold corresponding to the color of the metallic ink as the color of the distribution area of metallic ink expressing the metallic impression.

To display a preview image for a print job including a clear impression in step S130, or to display a preview image of a clear impression in step S140, the first controller 11 may display in the preview pane 32 a specific pattern or a pattern of a specific color in the distribution area of clear ink expressing the clear impression. The specific pattern indicating the distribution area of clear ink is a pattern that is different from the background pattern of the preview pane 32.

Figure 9:
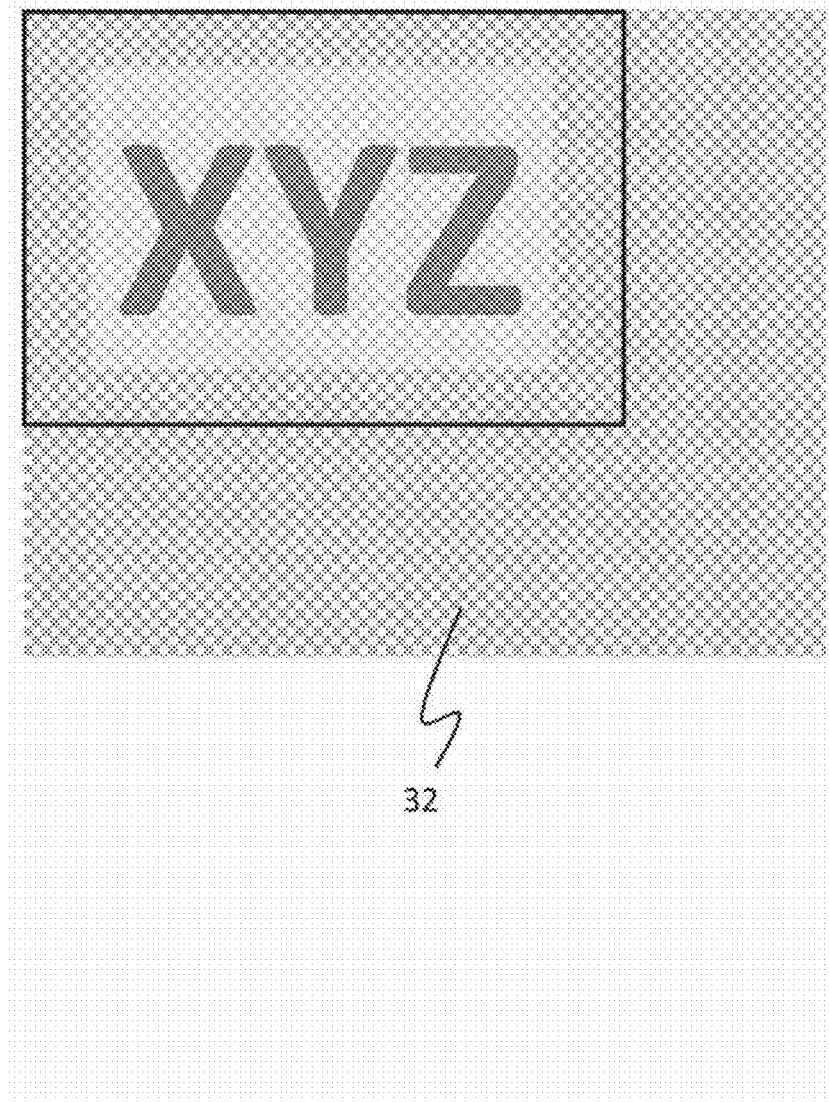
FIG. 9 shows an example of a preview image.

FIG. 9 shows a preview image that is displayed in the preview pane 32 in step S130 and is different from the examples in FIG. 7A and FIG. 7B. The preview image in FIG. 9 is a preview image displayed in the preview pane 32 when the layer order acquired in step S110 is color—white.

As described above, the first controller 11 can display the preview image after applying a transparency process to at least pixels other than pixels for objects in each image layer in the preview image. As shown in FIG. 9, the first controller 11 can therefore also display the preview image after applying a transparency process to all pixels, including pixels for objects, in each image layer in the preview image.

More specifically, when generating a preview image in step S120, the first controller 11 applies a transparency process setting the transparency of the pixels in the specific-color image data D11$pv$ that are not pixels for objects to 100%, and applies a transparency process setting the transparency of pixels for objects to 50%, for example. Of the pixels in the color image data D12$pv$, the first controller 11 applies a transparency process that sets the transparency of the pixels in the color image data D12$pv$ that are not pixels for objects to 100%, and applies a transparency process setting the transparency of pixels for objects to 50%, for example.

The first controller 11 then displays in the preview pane 32 a preview image overlaying the image layers processed for transparency in the specified layer order. In the example in FIG. 9, the background pattern of the preview pane 32 is visible in the characters XYZ, which are the objects in the preview image, and in the rectangular area that is to be printed with white ink. This configuration enables the user to see in greater detail from the preview image how the objects expressed by the image layers are overlaid.

Figure 10:
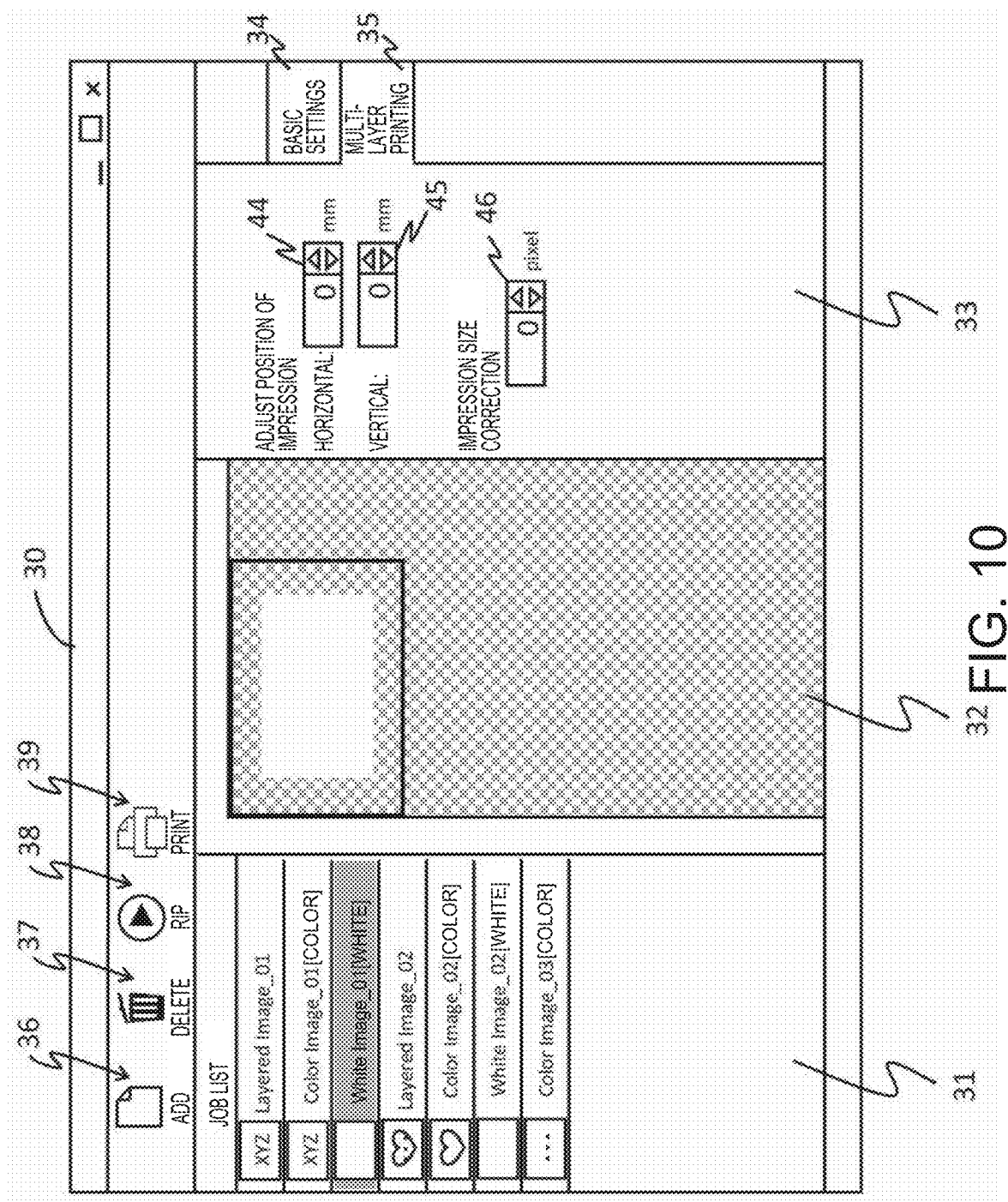
FIG. 10 shows an example of a user interface.

FIG. 10 shows another example of the user interface window 30. Unlike in FIG. 3, a single image layer is selected in the job list pane 31 in FIG. 10. More specifically, White Image_01 (white) indicating the specific-color image data D11 contained in the first print job is selected. In this case, the first controller 11 goes from the decision of step S100 to step S140, and displays the specific-color image data D11$pv$ shown in FIG. 4, which is preview image data for the specific-color image data D11, in the preview pane 32. FIG. 10 shows when the specific-color image data D11$pv$ is displayed in the preview pane 32.

Unlike in FIG. 3 and FIG. 8, the multi-layer printing tab 35 is selected in the user interface window 30 shown in FIG. 10, and multiple input fields 44, 45, 46 appropriate to the multi-layer printing tab 35 are displayed in the print settings pane 33. The multi-layer printing tab 35 can only be selected in the user interface window 30 when the number of layers in the input field 42 of the print settings pane 33 corresponding to the basic settings tab 34 is set to two layers or more.

Input field 44 and input field 45 are input fields for receiving a horizontal position adjustment value and a vertical position adjustment value for the image layer selected in the job list pane 31. The preview image is displayed at the reference position in the preview pane 32 when these adjustment values are 0. The reference position is the position where the top left corner of the preview image matches the top left corner of the preview pane 32.

By inputting an adjustment value to the input field 44 or input field 45, the user can shift the image layer selected in the job list pane 31, that is, the position of the image layer displayed in the preview pane 32, horizontally and vertically relative to the reference position. The display position is adjusted by image layer unit. The position adjustment made through input field 44 and input field 45 is the amount the position of the image layer shifts relative to the other image layers in the print job. In the example in FIG. 10, the user will adjust how much the specific-color image data D11 contained in first print job shifts horizontally and vertically relative to the color image data D12.

Input field 46 is a field for receiving a correction value for the size of the image layer selected in the job list pane 31. By inputting a correction value to the input field 46, the image layer selected in the job list pane 31, or more particularly the horizontal and vertical size of the image layer displayed in the preview pane 32, can be increased or decreased. The size correction is applied by image layer unit. The size correction made through input field 46 is the adjustment in size relative to the other image layers in the print job. In the example in FIG. 10, the user will adjust the horizontal and vertical size of the specific-color image data D11 contained in first print job relative to the color image data D12.

The first controller 11 changes the position and size of the preview image in the preview pane 32, and displays the modified preview image, in conjunction with receiving the adjustment values input through input field 44 and input field 45, and the correction value input through input field 46.

The first controller 11 stores the information received through input fields 40, 41, 42, 43, 44, 45, 46 in the print settings pane 33 as print settings information for the print job as shown in FIG. 4. More specifically, the print settings information in the print job is updated according to user operations in the print settings pane 33. It will also be obvious that print settings other than those shown in the print settings pane 33 in FIG. 3, FIG. 8, and FIG. 10 may be selected by the user, including page layout, number of copies, and color correction, for example.

The Delete button 37 included in the user interface window 30 is a button for deleting the print job selected in the job list pane 31 from the job list pane 31.

The RIP button 38 is a button for generating print data based on the print job selected in the job list pane 31. When a print job is selected in the job list pane 31 and operation of the RIP button 38 is then detected, the first controller 11 generates print data for each image layer contained in the selected print job.

The Print button 39 is a button for starting printing based on the print job selected in the job list pane 31. When a print job is selected in the job list pane 31 and operation of the Print button 39 is then detected, the first controller 11 sends print data generated for each image layer contained in the selected print job through the first communication interface 15 to the printer 20. The first controller 11 also sends the print settings information for the selected print job with the print data to the printer 20.

The second controller 21 of the printer 20 that receives transmission of the print data and printer settings information from the image processing device 10 then controls the printer engine 23 to print multiple layers on the print media according to the print data for each image layer and the print settings information, including the order of the image layers, position adjustment values, size correction values, and other settings.

4. Summary

An image processing device 10 according to this embodiment of the invention that displays a preview image of a print job on a display has a controller (first controller 11) that acquires the printing (layer) order of multiple image layers included in the print job, generates a preview image overlaying the multiple image layers according to the acquired printing order, and displays the generated preview image on the display.

By presenting a preview image overlaying the multiple image layers contained in the print job according to the acquired printing order on the display, the image processing device 10 in this configuration can show the user the expected result of printing the image layers in the acquired printing order before printing starts.

The controller in this embodiment also displays on the display input fields for receiving an instruction specifying the printing order of the multiple image layers, and acquires the printing order by receiving the instruction through the input fields.

The image processing device 10 in this configuration acquires the printing order selected by the user through the input field on the display. As a result, a preview image corresponding to the specified printing order can be presented on the display according to the printing order selected by the user.

The controller in this embodiment can also show the difference between the density of a preview image generated by overlaying multiple image layers according to a first printing order, and the density of a preview image generated by overlaying multiple image layers according to a second printing order that is different from the first printing order.

By displaying preview images, the image processing device 10 according to this configuration can show the user how differences in the printing order of the image layers will affect the actual printout.

The controller in this embodiment of the invention also generates preview images overlaying multiple image layers after applying a transparency process to the image layers.

The image processing device 10 in this configuration can show the user how objects expressed by multiple overlaid image layers will appear, and how areas that are not covered by objects in the image layers will appear, in the preview image.

The image processing device 10 according to this embodiment has a controller (first controller 11) that displays on a display a selection field for selecting a print job and one of multiple image layers contained in the print job, generates a preview image of multiple overlaid image layers when a print job is selected in the selection field, displays the generated preview image on the display, and when one of multiple image layers is selected in the selection field, displays the selected image layer as a preview image on the display.

The image processing device 10 in this configuration can present on a display a preview image of multiple overlaid image layers, or display an individual image layer as the preview image on the display, in response to the result of the user selecting a print job or image layer from the selection field on the display. As a result, the user can be shown in detail what the printout will look like before printing starts.

This embodiment of the invention also teaches an image processing program 12 that causes a computer to execute a process displaying a preview image of printing.

Step S110 in FIG. 6 is equivalent to an acquisition function that is embodied by the image processing program 12 and acquires the printing order of multiple image layers contained in a print job.

Step S120 is equivalent to a generating function that is embodied by the image processing program 12 and generates a preview image of multiple image layers overlaid according to the printing order.

Step S130 is equivalent to a display control function that is embodied by the image processing program 12 and displays the preview image on a display.

The image processing program 12 also causes a computer to execute a first display control function of displaying on a display a selection field (job list pane 31) for selecting a print job and one of multiple image layers contained in the print job; a generating function of generating a preview image of multiple overlaid image layers when a print job is selected in the selection field; and a second display control function of displaying the generated preview image on the display when a print job is selected in the selection field, and when one of multiple image layers is selected in the selection field, displaying the selected image layer as a preview image on the display.

5. Other Embodiments

Examples of other embodiments of the invention are described below.

The preview pane 32 may display a specific pattern as a background image as may be required.

Figure 11:
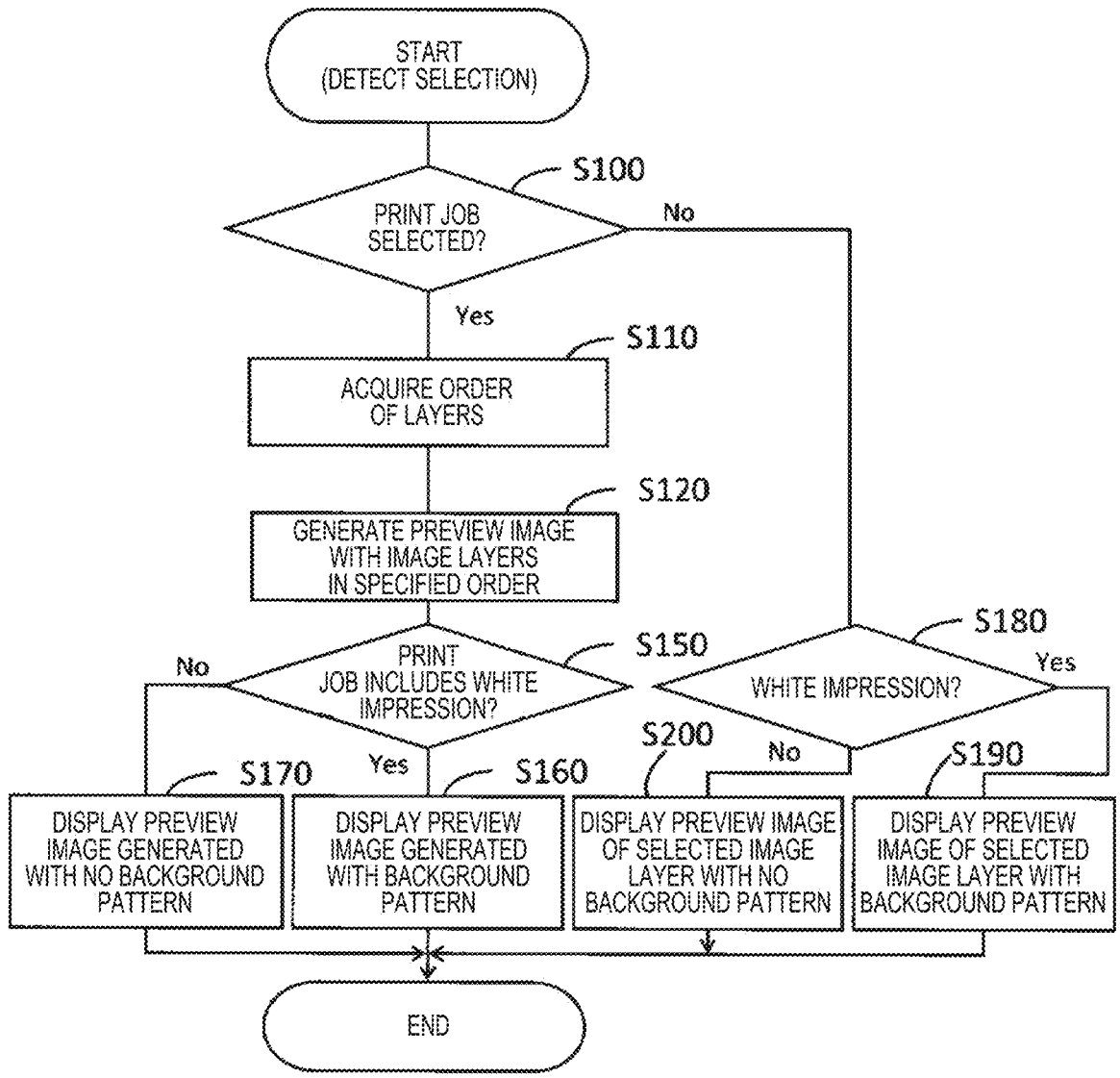
FIG. 11 is a flow chart of a preview image display control process in another example.

FIG. 11 is a flow chart of a control process for displaying a preview image according to another embodiment of the invention. Steps S100, S110, S120 are the same in FIG. 11 and FIG. 6.

In step S150 after step S120, the first controller 11 determines whether or not the selected print job contains a white impression, goes to step S160 if there is a white impression, and goes to step S170 if a white impression is not included. For example, if the first print job is selected in the job list pane 31, the first controller 11 returns Yes in step S150 and goes to step S160 because specific-color image data D11, which is a white impression, is included as one image layer in the first print job.

In step S160, the first controller 11 changes the background of the preview pane 32 to a background with a pattern, that is, changes the background to a specific pattern, and then renders and displays the preview image generated in step S120 in the preview pane 32.

However, in step S170, the first controller 11 changes the background of the preview pane 32 to no pattern, and then renders and displays the preview image generated in step S120 in the preview pane 32. The background of a preview pane 32 having no pattern is, for example, a solid white background.

If in step S100 the first controller 11 determines a single image layer contained in a print job was selected, the first controller 11 goes to step S180.

In step S180, the first controller 11 determines whether or not the selected image layer is a white impression, goes to step S190 if it is a white impression, and goes to step S200 if it is not a white impression. For example, if White Image_01 (white) of the first print job is selected in the job list pane 31, this means specific-color image data D11, which is a white impression, was selected, and the first controller 11 therefore returns Yes in step S180 and then goes to step S190.

In step S190, the first controller 11 changes the background of the preview pane 32 to a background with a pattern, and then renders and displays a preview image of the selected image layer in the preview pane 32.

However, in step S200, the first controller 11 changes the background of the preview pane 32 to a background with no pattern, and then renders and displays the preview image of the selected image layer in the preview pane 32.

The first controller 11 can obviously also apply the transparency process described above to each image layer before displaying the preview image on the display 13 in step S160, S170, S190, and S200.

When displaying a preview image in the preview pane 32 in these embodiments, the first controller 11 applies a background to the preview pane 32 at least when displaying a white impression. By the flow from step S100 to step S160, the first controller 11 displays a preview image with a specific pattern in the background when the multiple image layers contained in the print job include a white impression. This variation avoids being unable to differentiate in the preview image between areas having white gradation values and areas not having white gradation values in the white impression.

The configuration and design of the user interface window 30 is obviously not limited to the examples shown in FIG. 3, FIG. 8, and FIG. 10. For example, the input area for receiving the number of image layers and the printing order of the image layers in the print settings pane 33 is not limited to a single input field 42 as described above, and there may be an input field for receiving the number of image layers and another input field for receiving the printing order of the image layers.

In addition, the elements described as being in the user interface window 30 are not limited to all being in a single user interface window, and may be divided between multiple windows and displayed by changing the windows shown on the display 13.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An image processing device that displays on a display a preview image of printing a print job containing multiple image layers, comprising:
a controller configured to:
acquire a printing order of multiple image layers included in a print job,
generate a preview image overlaying the multiple image layers according to the acquired printing order, and
display the generated preview image within a display pane on the display,
wherein the controller makes a density of an object in the preview image, which is generated by overlaying the multiple image layers, different based on the printing order, and
the controller generates the preview image overlaying multiple image layers after applying a transparency process to each image layer.

2. The image processing device described in claim 1, wherein:
the controller displays on the display an input field that receives a command specifying a printing order of the multiple image layers, and acquires the printing order by receiving the command through the input field.

3. The image processing device described in claim 1, wherein:
the multiple image layers include an image layer printed using a white, clear, or metallic recording material.

4. The image processing device described in claim 1, wherein:
the controller makes the density of the preview image generated by overlaying multiple image layers according to a first printing order, and the density of the preview image generated by overlaying multiple image layers according to a second printing order that is different from the first printing order, different.

5. The image processing device described in claim 1, wherein:
the controller displays the preview image with a specific pattern as a background when the multiple image layers include a white impression that is printed with a white recording material.

6. The image processing device of claim 1, wherein the density of the object in the preview image is different where a layer order is white color and the preview image where the layer order is color white.

7. The image processing device of claim 6, wherein the density of the object in the preview image where the layer order is color—white is lighter color than the density of the object in the preview image where the layer order is white—color.

8. The image processing device of claim 1, wherein
the controller applies the transparency process to non-object pixels in each image layer to display areas in the preview image that are not covered by the object in any of the multiple image layers, and
wherein the controller provides a representation of a location in the preview image have a white graduation value in an image layer and presents a background where there is no white graduation value in an image layer.

9. An image processing device that displays on a display a preview image of printing, and comprises:
a controller that:
displays on a display a selection field for selecting a print job and one of multiple image layers contained in the print job,
generates a preview image overlaying the multiple image layers when a print job is selected in the selection field,
displays within a display pane the generated preview image on the display, wherein the controller makes a density of an object in the preview image, which is generated by overlaying the multiple image layers, different based on the printing order and the controller generates the preview image overlaying multiple image layers after applying a transparency process to each image layer, and
when one of the multiple image layers is selected in the selection field, displays the selected image layer as the preview image on the display.

10. The image processing device of claim 9, wherein the controller:
applies the transparency process to non-object pixels in each image layer to display areas in the preview image that are not covered by the object in any of the multiple image layers, and
provides a representation of a location in the preview image have a white graduation value in an image layer and presents a background where there is no white graduation value in an image layer.

11. A non-transitory computer-readable computer medium storing an image processing program that causes a computer to execute a process displaying a preview image of printing, comprising:
an acquisition function that acquires a printing order of multiple image layers contained in a print job;
a generating function that generates a preview image of multiple image layers overlaid according to the acquired printing order; and
a display control function that displays the preview image within a display pane on a display, wherein a density of an object in the preview image, which is generated by overlaying the multiple image layers, is different based on the acquired printing order and the controller generates the preview image overlaying multiple image layers after applying a transparency process to each image layer.

12. The non-transitory computer-readable computer medium of claim 11, wherein the controller applies the transparency process to non-object pixels in each image layer to display areas in the preview image that are not covered by the object in any of the multiple image layers, and wherein the controller provides a representation of a location in the preview image have a white graduation value in an image layer and presents a background where there is no white graduation value in an image layer.

* * * * *